(12) United States Patent
Bostick et al.

(10) Patent No.: US 10,812,769 B2
(45) Date of Patent: Oct. 20, 2020

(54) VISUALIZING FOCUS OBJECTS FROM VIDEO DATA ON ELECTRONIC MAPS

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 19 days.

(21) Appl. No.: 15/681,900

(22) Filed: Aug. 21, 2017

(65) Prior Publication Data

US 2019/0058856 A1 Feb. 21, 2019

(51) Int. Cl.
| | | |
|---|---|---|
| *H04N 9/80* | (2006.01) | |
| *H04N 9/87* | (2006.01) | |
| *G11B 27/34* | (2006.01) | |
| *H04N 21/442* | (2011.01) | |
| *G06K 9/66* | (2006.01) | |
| *G06T 17/05* | (2011.01) | |
| *G06K 9/00* | (2006.01) | |
| *H04N 21/44* | (2011.01) | |

(52) U.S. Cl.
CPC ....... *H04N 9/8715* (2013.01); *G06K 9/00718* (2013.01); *G06K 9/66* (2013.01); *G06T 17/05* (2013.01); *G11B 27/34* (2013.01); *H04N 21/44008* (2013.01); *H04N 21/44218* (2013.01)

(58) Field of Classification Search
CPC .......... H04N 9/8715; H04N 21/44008; H04N 21/44218; G06K 9/00718; G06K 9/66; G06T 17/05; G11B 27/34

USPC ......................................................... 386/248
See application file for complete search history.

(56) References Cited

U.S. PATENT DOCUMENTS

| | | | |
|---|---|---|---|
| 8,494,215 B2 | 7/2013 | Kimchi et al. | |
| 8,996,305 B2 | 3/2015 | Kesar et al. | |
| 9,507,778 B2 | 11/2016 | Jaffe et al. | |
| 2004/0240542 A1* | 12/2004 | Yeredor | G06K 9/00771 |
| | | | 375/240.01 |

(Continued)

FOREIGN PATENT DOCUMENTS

WO 2015080718 A1 6/2015

OTHER PUBLICATIONS

Nielsen, "F-Shaped Pattern for Reading Web Content," Nielsen Norman Group, Apr. 17, 2006, 3 pages http://www.nngroup.com/articles/f-shaped-pattern-reading-web-content/.

*Primary Examiner* — Helen Shibru
(74) *Attorney, Agent, or Firm* — Peter K. Suchecki (57) ABSTRACT

A computer implemented method includes receiving video data of objects in a geographic area. The video data includes location data indicating a location of the geographic area, focus data indicating areas of the video data focused on while viewing the video data. The method also includes identifying, using at least the focus data, a first object focused on while viewing the video data. The method then includes extracting an image of the first object from the video data. The method additionally includes determining, using the image and the location data, a second object corresponding to the first objection on a visual data map of the geographic area. The method further includes rendering an indicator of the first object at the second object in visual data map.

20 Claims, 5 Drawing Sheets

(56) References Cited

U.S. PATENT DOCUMENTS

| | | | |
|---|---|---|---|
| 2009/0153678 A1* | 6/2009 | Nonaka | G06F 3/017 |
| | | | 348/208.4 |
| 2009/0278937 A1 | 11/2009 | Botchen et al. | |
| 2012/0307108 A1 | 12/2012 | Forutanpour | |
| 2013/0050564 A1 | 2/2013 | Adams, Jr. et al. | |
| 2014/0086553 A1* | 3/2014 | Moon | H04N 9/87 |
| | | | 386/239 |
| 2015/0043783 A1* | 2/2015 | Ishihara | G06T 7/571 |
| | | | 382/106 |
| 2015/0116524 A1* | 4/2015 | Mizuno | H04N 5/23206 |
| | | | 348/211.11 |
| 2015/0268822 A1* | 9/2015 | Waggoner | G06F 3/04842 |
| | | | 715/722 |
| 2015/0339539 A1 | 11/2015 | Gu et al. | |
| 2015/0347465 A1 | 12/2015 | Horowitz | |
| 2016/0187972 A1* | 6/2016 | Biswas | G06Q 30/02 |
| | | | 345/156 |
| 2016/0349840 A1* | 12/2016 | Fujiwara | G05B 19/042 |
| 2017/0046847 A1 | 2/2017 | Bostick et al. | |
| 2017/0084083 A1* | 3/2017 | Wilson | G09G 5/026 |
| 2017/0123492 A1* | 5/2017 | Marggraff | H04N 5/247 |
| 2017/0351327 A1* | 12/2017 | Yasuda | G06F 3/038 |
| 2018/0081171 A1* | 3/2018 | Park | G06F 3/013 |
| 2018/0095530 A1* | 4/2018 | Rakshit | G06F 16/444 |
| 2018/0103196 A1* | 4/2018 | Lee | H04N 5/23216 |
| 2018/0130194 A1* | 5/2018 | Kochura | G10L 15/26 |
| 2018/0146198 A1* | 5/2018 | Atluru | H04N 19/597 |
| 2018/0165857 A1* | 6/2018 | Lee | G06F 3/013 |
| 2019/0073520 A1* | 3/2019 | Ayyar | G06K 9/42 |

* cited by examiner

VISUALIZING FOCUS OBJECTS FROM VIDEO DATA ON ELECTRONIC MAPS

BACKGROUND

The present disclosure relates to image processing, and more specifically, to identifying and visualizing areas of interest on an electronic map based on video playback watch patterns.

SUMMARY

According to embodiments of the present disclosure, a method can include receiving video data of objects in a geographic area. The video data includes location data indicating a location of the geographic area, focus data indicating areas of the video data focused on while viewing the video data. The method also includes identifying, using at least the focus data, a first object focused on while viewing the video data. The method then includes extracting an image of the first object from the video data. The method additionally includes determining, using the image and the location data, a second object corresponding to the first objection on a visual data map of the geographic area. The method further includes rendering an indicator of the first object at the second object in visual data map.

Various embodiments are directed to systems and computer program products for executing the methods described herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to image processing, more particular aspects relate to identifying and visualizing areas and objects of interest on an electronic map based on eye focus data of a user viewing a video playback. While the present disclosure is not necessarily limited to such applications, various aspects of the disclosure may be appreciated through a discussion of various examples using this context.

Embodiments of the present disclosure are based on the recognition that video playback watch patterns, based on capturing eye focus data of a user watching the playback, may be used to identify objects and areas of interest in a video and map these objects and areas interests (hereinafter, "focused on objects") to an electronic map (e.g., a two dimensional or three dimensional electronic map). A cognitive system may be used to identify focused on objects in a video and determine a video content capture area bounding the focused on objects (e.g., latitude and longitude range of a boundary of a focus area enclosing the focused on objects. The focused on objects or the video content capture area may then be mapped to corresponding areas in an electronic map. The electronic map may visualize specific objects and locations that appear in a video and may indicate a duration of time they appear in the video. This enables a user to visualize which objects and locations were focus on in a particular video.

In view of this recognition, embodiments of this disclosure include a method, system and computer program product for visualizing areas and objects of interest on an electronic map based upon video playback watch patterns (e.g., eye focus points). As users watch videos, their eye focus points are recorded, the objects at those focus points identified, and those objects are extrapolated onto an electronic map. Using these embodiments, a user may see the objects (or areas) that most captured their attention plotted onto an electronic map. Additionally, advertisers may see a visualization of areas users most focus on for the purposes of placing display advertisements in the most high focus areas. Furthermore, users may search for an object and see a visualization of locations which have received the most views of that object.

Embodiments of this disclosure provide a modified visualization. In place of visualizing the locations that are focused on by a user viewing a given video, these embodiments provide a visualization of which objects and locations a user looked at in a video, as mapped on an electronic map.

According to various embodiments, the present disclosure may enable geographic locations that a user most focused on while viewing a single video to be visualized (e.g., rendered) on an electronic map. The present disclosure may further enable geographic locations viewed most by a set (e.g., two or more) of users when viewing a single video to be visualized on an electronic map. Some embodiments of the present disclosure may enable geographic locations viewed most by a set of users when viewing a set of videos of a given location to be visualized on an electronic map.

Embodiments of the present disclosure may enable highlighting objects of interest on, for example, a street level view map or other electronic map, to emphasize areas in a given location that are most focused on by users who view videos of the location. These objects of interests may be highlighted as objects of interest. Some embodiments may enable advertisement placement on, for example, three dimensional (3D) maps, showing a visualization of which areas users most focus on while watching a video. These areas of focus may be selected to place display advertisements. Other embodiments may enable search operations to, for example, enable a user to search for an object and see a visualization of the locations which having the object which received the most views. For example, a user may search for a "cherry blossom tree" and see a visualization of cherry blossom tree locations which have received the most user views.

Embodiments of this disclosure include a method, a system and a computer program product to capture user eye focus points during a video playback, analyze the eye focus points to determine or identify geographical objects and areas the user focused on during the video play back, and augment an electronic map (e.g., a 3D map or a Street View map) with eye focus concentration points, based on the focus points from the viewing of videos. The eye focus concentration points may be points or areas shown in the video having the most eye focus points.

Embodiments of the present disclosure enable extrapolation of eye focus points from watched videos onto an electronic map to indicate points of focus. Embodiments further enable the ability to search an electronic map (a 3D map or a street level view map) for an object to see a visualization of the frequency of views for that object. Embodiments further enable the ability to extrapolate eye tracking data (e.g., eye focus points) to enable software to suggest appropriate locations for placement of advertisements.

Embodiments of the present disclosure may include a series of stages. A first stage may include capturing eye focus points of a user viewing a video during a playback of the video. In this first stage, the eye focus points are captured by, for example, an eye tracking system. For example, a user may watch a video featuring an indoor or outdoor mapped location on a video playing device (for example a mobile device or laptop) that is embedded with an eye tracking system that tracks the user's eye focus point in the display dimension (e.g., within the display boundaries or video display area of the video display device). The video playing device may record which portion of the video display area the display device the user focusses on. This area may be an eye focus point. The user's eye focus point for each frame of video content may be captured, recorded and associated with the frame.

A second stage of the present disclosure may include analyzing eye focus points to determine focused on objects. In this stage, each eye focus point captured in the first stage is analyzed to determine which objects a user viewing a playback of a video focused while viewing playback. Determining the objects a user focused on may include extracting metadata from the video. This metadata may include information added to the video at the time of recording to the video and may include one or both of the following:

A geographic location of the capture point—the physical location of a camera used to capture the video while the camera is capturing the video. In some embodiments, the geographic location of the capture point may be captured by, for example, a global positioning system (GPS) computer chip embedded in, or associated with, the camera.

A direction of capture—the compass direction that the camera was pointed in while capturing the video. The direction of capture may be captured by, for example, a digital compass embedded in, or associated with, the camera.

A location of the camera while capturing a video may be determined using metadata extracted from the video or video data associated with the video. A cognitive system may analyze eye focus points for frames of a video. The cognitive system may use include a set of algorithms and software applications trained using, for example supervised or unsupervised learning techniques to enable image recognition operations (e.g., image segmentation, classification, or other object/data recognition operations). The cognitive system may use the image recognition operations to determine which object in a video a user focused on while viewing a video. As an example, a cognitive system may determine, using eye focus points, that a user focused on a mailbox while viewing a playback of a video. An object identified (e.g., a first object) in a frame of a video by the cognitive system may be cognitively compared to an electronic map containing, for example, visual data of a geographic area including the identified object, to identify a second object in the electronic map corresponding to the first object. The electronic map may include satellite images of the geographic area and street level view data. The cognitive system, in response to matching the object identified in the video frame with the object located in the electronic map, may retrieve coordinates (or other locating information) for the object located in the electronic map. For example, the cognitive system may map a mailbox identified in a frame of a video to its location outside of a house at 1536 on Fairbanks Road. In some embodiments, temporal or transitory objects (e.g., objects that are not permanently located in a given area) such as people and vehicles are ignored, as they may not appear in the electronic map. Identified objects may be recorded for each frame of a video.

A third stage of the present disclosure includes visualization of eye focus points on an electronic map. In this stage, eye focus points may be plotted on an electronic map. In certain embodiments, an electronic map may be augmented with eye focus concentration points, based on the focus points from the viewing of videos. The augmentation, for a single user viewing a playback of a single video, may include modifying an electronic map to emphasize (e.g., show or highlight) objects a single user viewed when watching a single video. The augmentation, for a single user viewing a playback of a set of videos, may include modifying an electronic map to emphasize objects a single user viewed when watching the set of videos. For example, an electronic map augmented in this way may show all the objects a user focused on across their entire video viewing history on a video streaming service. The augmentation, for a set of user viewing a playback of a set videos, may include modifying an electronic map to emphasize objects an aggregate of users viewed when watching videos. For example, an electronic map augmented in this way may show, for a given area, which objects are most popular based on the viewing patterns for all users on a video streaming service. This would be useful for an advertiser looking to find the optimal place to post a billboard advertisement.

In some embodiments, an electronic map may be augmented with focus concentration points to indicate areas or objects on an electronic map that have attracted the most eye focus points while playing back a video.

In certain embodiments, an augmented reality display of user physically located at a given geographic location may be augmented to indicate objects in that location that have attracted the most eye focus points from one or more videos.

In other embodiments, a mobile device viewfinder may be augmented to overlay focus concentration points on objects appearing in the viewfinder.

Figure 1:
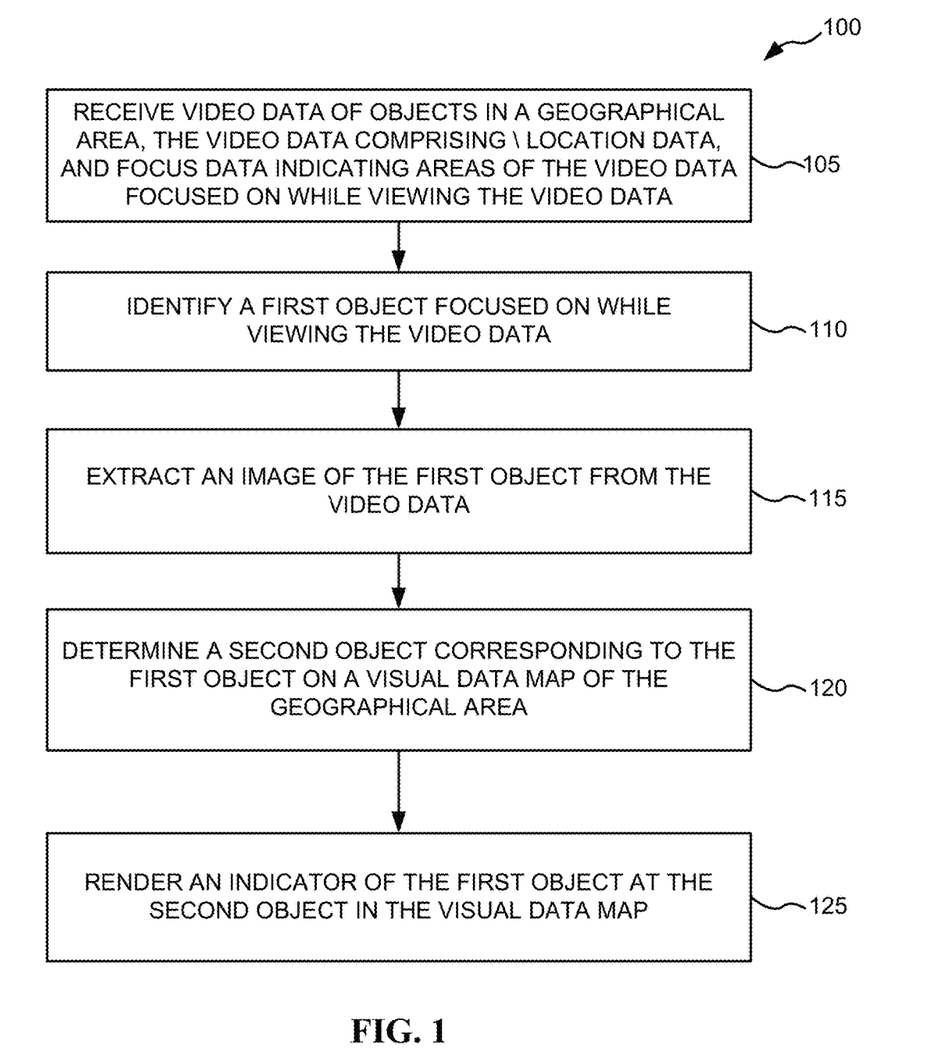
FIG. 1 depicts a flowchart of computer implemented operations for detecting and visualizing areas or objects of interest on an electronic map based on eye focus data of a user viewing a video playback, according to various embodiments.
Figure 2:
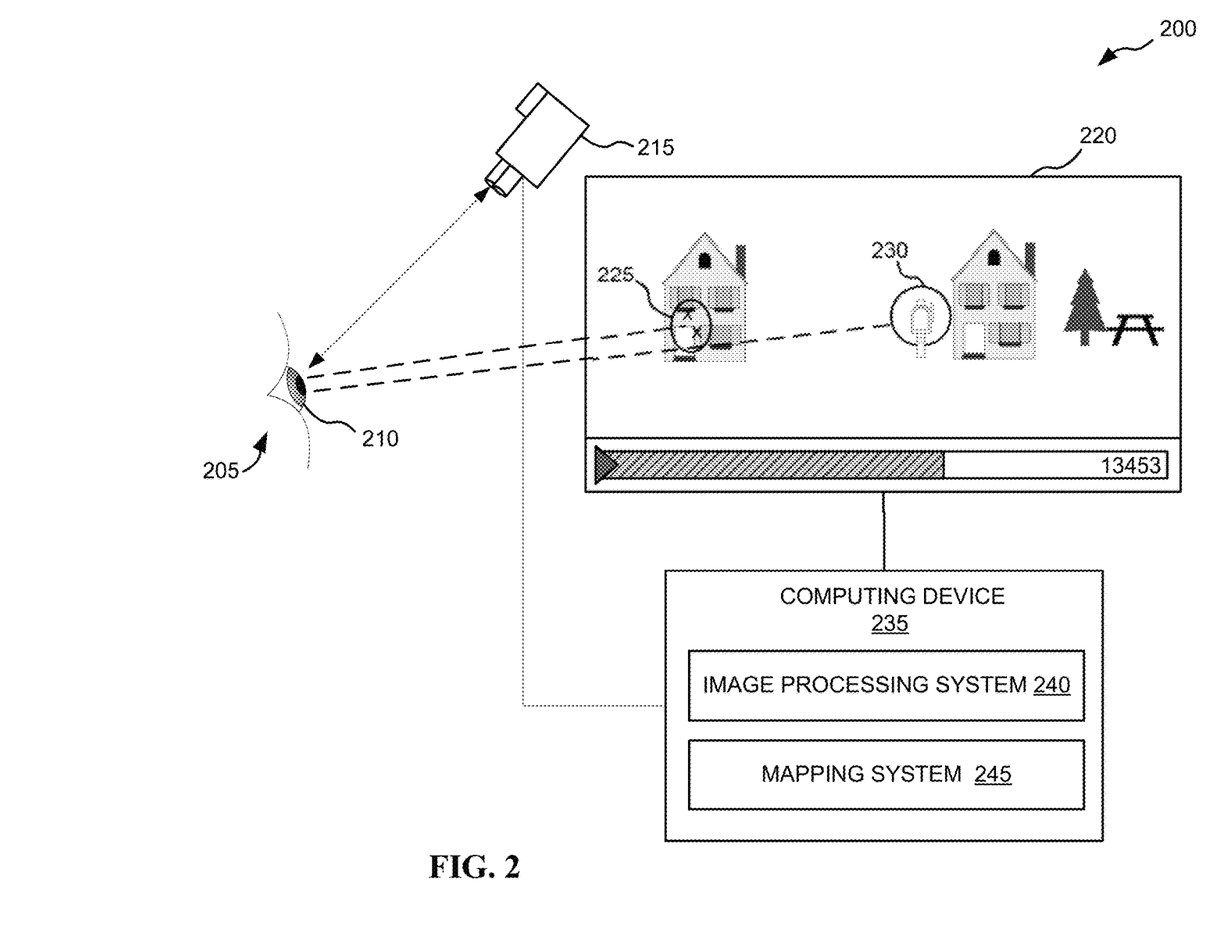
FIG. 2 depicts a block diagram of system for detecting and visualizing areas and objects of interest on an electronic map based on eye focus data of a user viewing a video playback, according to various embodiments.
Figure 5:
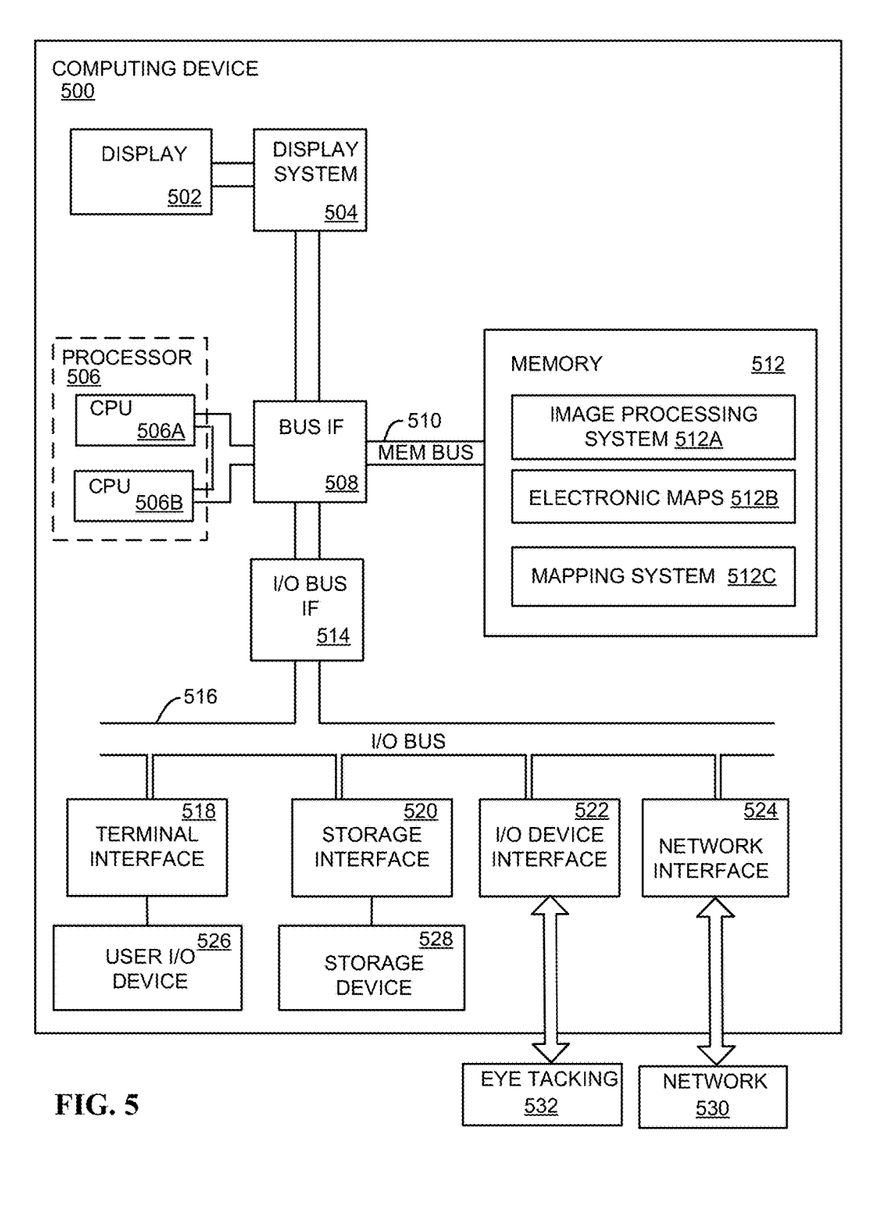
FIG. 5 depicts a block diagram of an example computing device 500 for detecting and visualizing areas and objects of interest on an electronic map based on eye focus data of a user viewing a video playback, according to various embodiments.

Turning now to the figures, FIG. 1 depicts a flowchart 100 of computer implemented operations for detecting and visualizing areas and objects of interest on an electronic map based on eye focus data of a user viewing a video playback, according to various embodiments. The operations depicted in the flowchart 100 may be implemented in, or executed by, a computing device such as the computing device 235 (FIG. 2), 310 (FIG. 3), and 500 (FIG. 5). In some embodiments, the computing device may include an eye tracking system such as the eye tracking system 215 (FIG. 2). The operations of flowchart 100 may be implemented in, or executed by, software, firmware, and electronic circuits associated with the computing device and the eye tracking system. The computing device, eye tracking system, and associated software, firmware, and electronic circuits may collectively be referred to as a computing system.

The computing system may execute operation 105 to receive video data of objects in a geographic area. The video data may include a video recording (e.g., video) of scenes and objects in the geographic area. The video data may additionally include location data (e.g., geographic location data) indicating a location of a camera used to capture the video data. In some embodiments, the location data may be captured by a GPS device or circuit associated with the camera and may include the coordinates of the camera while the camera was recording each scene or location in the video. The location data may include latitude and longitudinal coordinates. In certain embodiments, the location data may include compass direction (e.g., captured by a digital campus associated with the camera) indicating a direction the camera was pointed in while capturing the video data. In other embodiments, the location data may include a street address or other information for determining a geographical location.

The video data may further include focus data indicating areas of a visual display of the video data (e.g., the video recording) focused on while viewing a playback of the video data. The focus data may be captured by an eye tracking system which tracks points or locations on a screen or other display focused on by a user while viewing the playback the video data. In some embodiments, the focus data may include horizontal and vertical coordinates (e.g., row and column numbers) of pixels focused on by the user.

In various embodiments, the video data, including the video recording, the location data and the focus data may be received in on or more data structures in a memory of a computing device associated with the computing system. In video and location data may be contemporaneously captured and received by the computing system, while the focus data may be captured and/or received at a different time, subsequent to capturing and receiving the video recording and the location data.

The computing system may execute operation 110 to identify objects focused on while viewing the video data (e.g., while viewing a playback of the video recording). For a given frame of a video, the computing system may identify an object focused on by a user by, for example, determining a location of a point in the frame focused on by a user while viewing the frame (e.g., an eye focus point). The computing system may then execute one or more image processing algorithms (e.g., a cognitive image recognition algorithm) to determine a boundary of an object in the frame encompassing the eye focus point. The computing system may use the determined boundary to extract image of an area of the frame focused on. Extracting an image of an area of the frame, stored in a first area of memory, may include copying a portion of the frame to a second area of memory. The computing system may then identify the focused on object using the extracted image and one or more image processing algorithms. In various embodiments, the computing system may identify the focused on object by training an image classification algorithm using a set of images and known objects in the images. The computing system may then execute the trained classification algorithm using the extracted image to identify the focused on object.

In some embodiments a focused on object may be determined by identifying objects encompassing eye focus points in a set of two or more frames of a given scene in a video and selecting an object in the frames having the most eye focus points as the focused on object. The focused on object, for example, may be an object that is identified in the most frames of a given set of frames. In some embodiments, the given set of frames may be frames from a single video viewed by one or more users. In others embodiments, the given set of frames may be frames from a set of videos viewed by one or more single user.

The computing system may execute operation 115 to extract an image of an object focused on while viewing a playback of the video data (focused on object). In some embodiments, the computing system may extract an identifier of the focused on object. For example, when the focused on object is a mailbox, the computing system may extract an image of the mailbox or, for example, the string "mailbox".

The computing system may execute operation 120 to determine an object (second object) corresponding to a focused on object (first object) in an electronic map of a geographic area in which the video was captured. The electronic map may include satellite images of an area and street view data (e.g., data showing a street level view of a geographic area). The computing system may determine the second object by executing one or more cognitive algorithms to compare the extracted image or identifier of the focused on object to objects of images on the electronic map. When the computing system finds a match, the computing system may retrieve the location of the second object in the electronic map. For example, when the focused object is a mailbox, an address of the mailbox may be retrieved from the electronic map. In some embodiments, the focused on object may be mapped to the retrieved location and stored in a data structure or electronic database. In some embodiments, the corresponding second object may be mapped and the location of the corresponding second object may be to the data structure or electronic database.

The computing system may execute operation 125 to render an indicator of the focused on object at the second object in the electronic map using, for example, the location information extracted in operation 120. In some embodiments, the computing system renders the indicator by overlaying a symbol on the second object. In certain embodiments, the computing system renders the indicator by augmenting a display of the second object in a display of the electronic data map.

In some embodiments, the operations of flowchart 100 may be executed for a set (e.g., two or more) of users viewing a set of videos. For example, the video data received in operation 105 may include two or more videos and focus data corresponding to each of the two or more videos. The focus data corresponding to each video may be generated from a set of users who viewed the video.

In some embodiments, focused on objects (or objects in an electronic map corresponding to the focused on objects)

may be used to build an electronic database of focused on objects. The electronic database may be an instance of each focused on object and a location of the focused on object in an electronic map. The electronic database may further include an indication of the video (e.g., in a set of videos) having the focused on object and a user (e.g., in a set of users), or the number of users, that viewed the video or focused on the focused object. The computing system may receive queries providing identifiers of focused on objects stored in the electronic database. The identifiers may be used to identify the queried focused on objects in the electronic database and render indicators on an electronic map at the queried object's location. The indicators may indicate a number of times the queried objects were focused on the video data or in a set of videos.

In some embodiments, the computing system may search the electronic database to identify a set of objects focused on by a single user while viewing a set of two or more videos. The identified set of objects may then be rendered on an electronic map (e.g., indicators may be rendered at the location of the set of objects on the electronic map).

According to various embodiments, the computing system may search the electronic database to identify a set of objects focused on by a set of two or more users while viewing a set of two or more videos. The set of objects may be a set of object focused on by a majority of users in the set of two or more users. The identified set of objects may then be rendered on an electronic map (e.g., indicators may be rendered at the location of the set of objects on the electronic map).

FIG. 2 depicts a block diagram of system 200 for detecting and visualizing areas and objects of interest on an electronic map based on eye focus data of a user viewing a video playback, according to various embodiments. In some embodiments, the system 200 includes an eye tracking system 215, a display device 220 and a computing device 235. The system 200 may execute the operations described in the flowchart 100 (FIG. 1).

The eye tracking system 215 may include one or more sensors (e.g., optical sensors) for tracking the eyes 210 of a user 205 while the user is viewing a playback of video data, as described herein. The eye tracking system may include electronic circuits and software and firmware components configured to map sensor data indicating the positions of focus of the eyes 210 of the user 205 to one or more points in frames of the video data (e.g. eye focus points). The electronic circuits and software and firmware components may be further configured to transmit the sensor data or the eye focus points to the computing device 235.

The display device 220 may be a display screen for visually displaying a playback of video data, as described herein. In some embodiments, the display device 220 may be used to render a visual display of an electronic data map. The display device 220 shows two sets of eye focus points 225 and 230 for a user 205 while viewing a playback of video data. In some embodiments, the focus points 225 and 230 are not shown on the display device 220 during playback. The focus points 225 and 230 may be associated, and stored, with frames of the video data.

The computing device 235 may be computing device such as the computing device 500 (FIG. 5). In some embodiments, the computing device 235 includes image processing system 240 and mapping system 245.

The image processing system 240 may be a cognitive system configured or trained to analyze eye focus points provided by the eye tracking system 215 for a given frame of displayable video data to identify focused on objects, as described herein. In various embodiments, the image processing system 240 identifies focused on objects, boundaries of focused on objects, or portions of a frame including focused on objects. In certain embodiments, the image processing system 240 associates or maps a focused on object to one more identifiers of the focused on object, as described herein.

The mapping system 245 may include one or more electronic circuits or software applications for rendering a visual display of an electronic data map. In some embodiments, the mapping system 245 may enable computing device 235 to determine the location of focused on objects in an electronic data map. In certain embodiments, the mapping system 245 may enable the computing system 235 to render indicators on focused on objects in an electronic data map.

Although shown as distinct systems, the image processing system 240 and the mapping system 245 may be part of the same application, and may include a shared set of image processing algorithms (e.g., cognitive image recognition algorithms) to enable the computing device 235 to execute the operations of described herein.

Although not shown, in some embodiments, the system 200 may include a video capture device (e.g., a camera) for capturing the video data displayed on display device 220. The video capture device may include GPS components for determining a location of the video capture device while capturing the video data. The video capture device may also include an electronic compass for determining an orientation (e.g., direction) of the video capture device while capturing the video data. The video capture device may further include electronic circuits and software or firmware components for encoding the captured location and orientation data with the video data.

Figure 3:
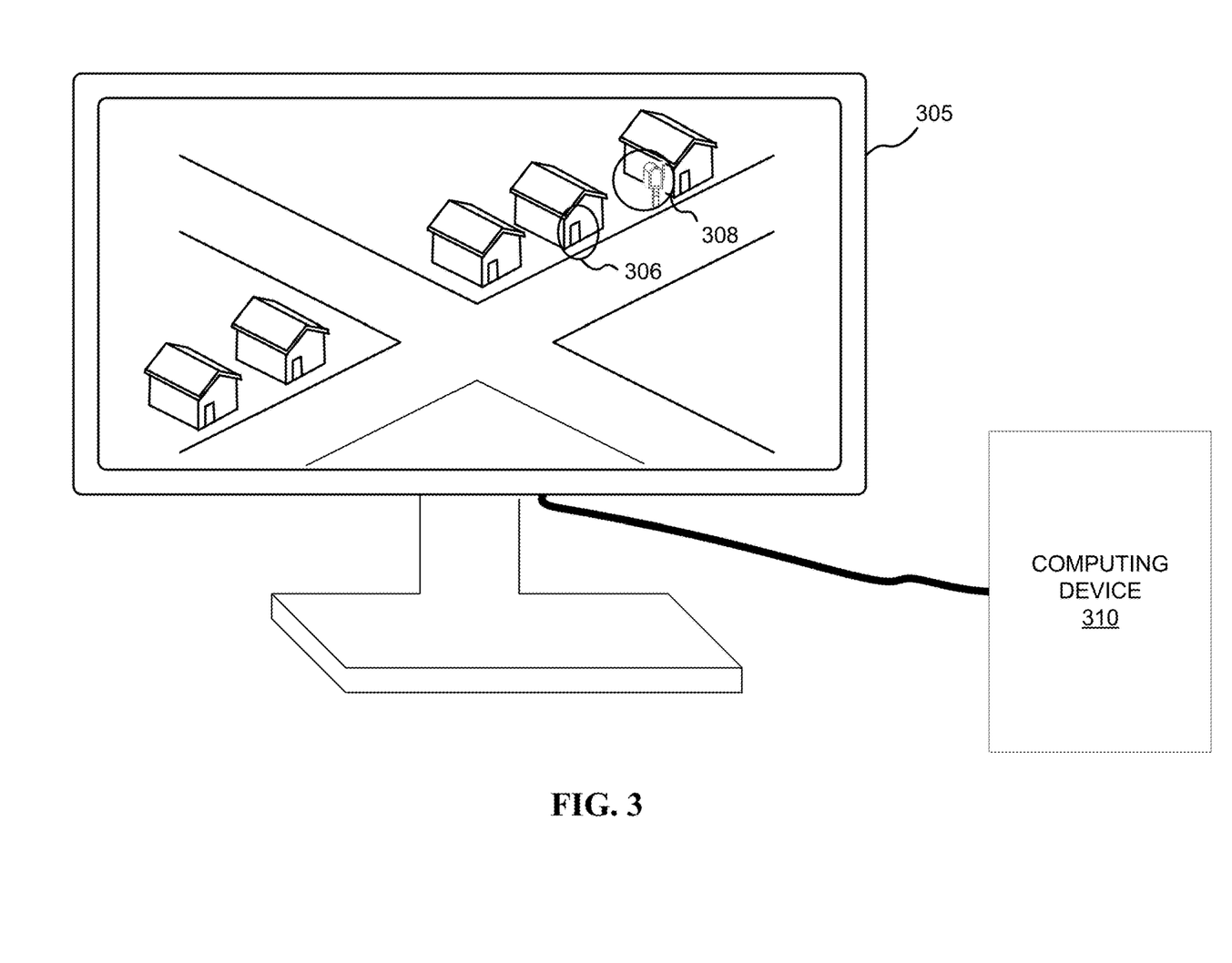
FIG. 3 depicts a block diagram of a computing system displaying an electronic map with areas and objects of interests detected while viewing a video, according to various embodiments.

FIG. 3 depicts a block diagram of a computing system displaying an electronic map with areas and objects of interests detected while viewing a video, according to various embodiments. The block diagram includes a display device 305 and computing device 310. The display device may be substantially similar to the display device 220 (FIG. 2) and 502 (FIG. 5), while the computing device 310 may be substantially similar to the computing device 235 and 500. As showing in FIG. 3, the display device 305 may render an electronic map data of a geographic area including a geographic area shown on the display device 220 in FIG. 2. The rendering of the electronic map data is augmented to include indicators of objects 306 and 308 focused on by the user 205 (FIG. 2). The objects 306 and 308 corresponds to the eye focus points 225 and 230 shown in FIG. 2.

Figure 4:
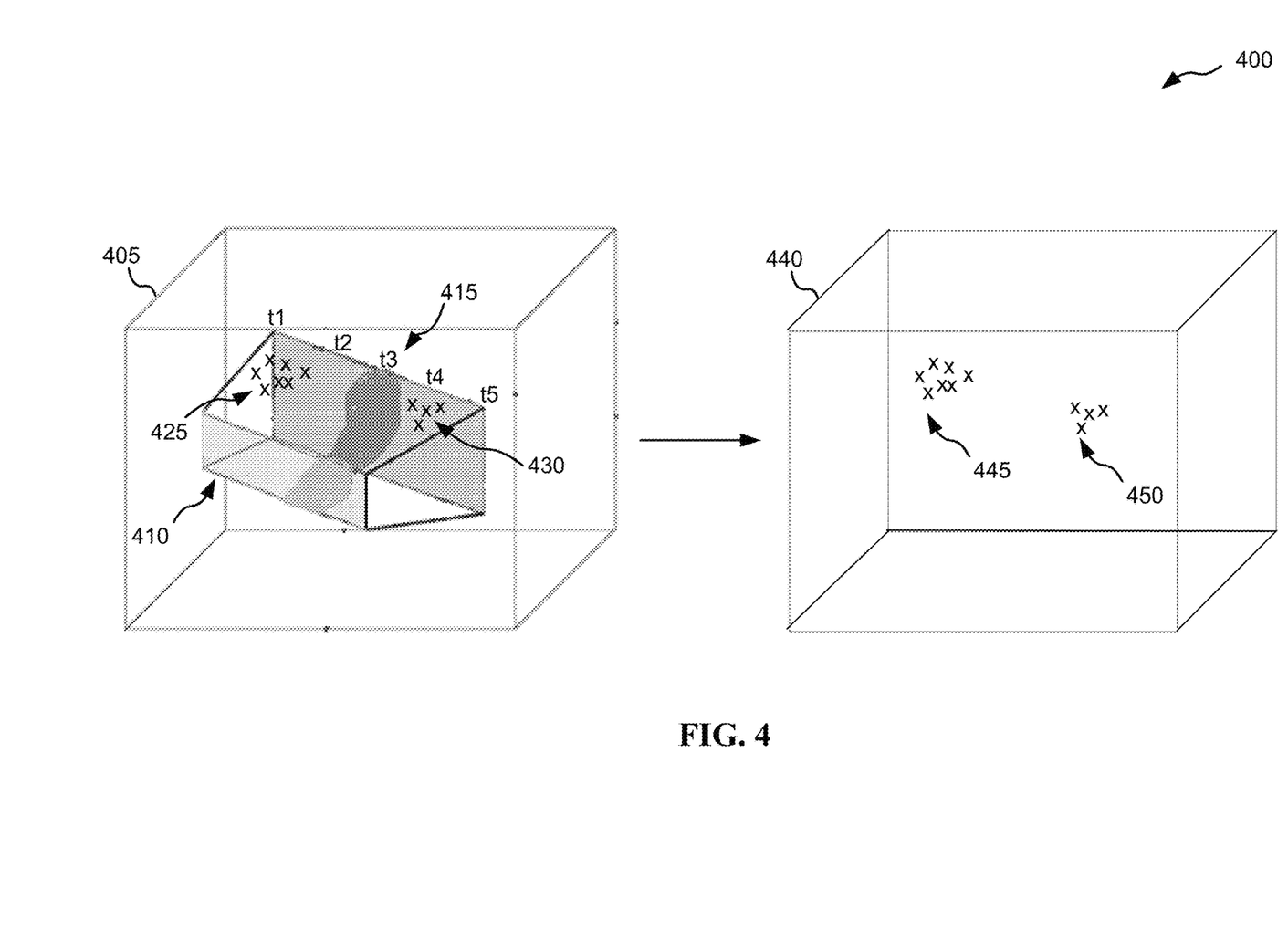
FIG. 4 depicts a block diagram of mapping eye focus points detected in frames of a video playback to an electronic map, according to various embodiments.

FIG. 4 depicts a block diagram of mapping eye focus points detected in frames of a video playback to an electronic map, according to various embodiments. FIG. 4 includes a section of a visual display of an electronic map 405 including an overlay of a geographic area 410 included in a visual display of a playback of video data, as described herein. Frames of the video data from time t1 to time t5 includes the geographic area 410. Eye focus points 425 and 430 show locations the geographic area 410 focused on by a user while viewing a set of frames between time t1 and time t5. FIG. 5 additionally includes a section of a visual display of an electronic map 440 corresponding to the section of a visual display of an electronic map 405 without the overlay of the display of the video data. The visual display of the electronic map 440 includes eye focus points 445 and 450 corresponding, respectively, to eye focus points 425 and 430.

FIG. 5 depicts a block diagram of an example computing device 500 for detecting and visualizing areas or objects of interest on an electronic map based on eye focus data of a user viewing a video playback, according to various embodiments. The components of the computing device 500 can include one or more processors 506, a memory 512, a terminal interface 518, a storage interface 520, an Input/Output ("I/O") device interface 522, and a network interface 524, all of which are communicatively coupled, directly or indirectly, for inter-component communication via a memory bus 510, an I/O bus 516, bus interface unit ("IF") 508, and an I/O bus interface unit 514.

The computing device 500 may include one or more general-purpose programmable central processing units (CPUs) 506A and 506B, herein generically referred to as the processor 506. In an embodiment, the computing device 500 may contain multiple processors; however, in another embodiment, the computing device 500 may alternatively be a single CPU device. Each processor 506 executes instructions stored in the memory 512.

The computing device 500 may include a bus interface unit 508 to handle communications among the processor 506, the memory 512, the display system 504, and the I/O bus interface unit 514. The I/O bus interface unit 514 may be coupled with the I/O bus 516 for transferring data to and from the various I/O units. The I/O bus interface unit 114 may communicate with multiple I/O interface units 518, 520, 522, and 524, which are also known as I/O processors (IOPs) or I/O adapters (IOAs), through the I/O bus 516. The display system 504 may include a display controller, a display memory, or both. The display controller may provide video, audio, or both types of data to a display device 502. The display memory may be a dedicated memory for buffering video data. The display system 104 may be coupled with a display device 502, such as a standalone display screen, computer monitor, television, a tablet or handheld device display, or another other displayable device. In an embodiment, the display device 102 may include one or more speakers for rendering audio. Alternatively, one or more speakers for rendering audio may be coupled with an I/O interface unit. In alternate embodiments, one or more functions provided by the display system 504 may be on board an integrated circuit that also includes the processor 506. In addition, one or more of the functions provided by the bus interface unit 508 may be on board an integrated circuit that also includes the processor 506.

The I/O interface units support communication with a variety of storage and I/O devices. For example, the terminal interface unit 518 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 526 and the computing device 500, may receive output data via the user output devices. For example, a user interface may be presented via the user I/O device 526, such as displayed on a display device, played via a speaker, or printed via a printer.

The storage interface 520 supports the attachment of one or more disk drives or direct access storage devices 528 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 528 may be implemented via any type of secondary storage device. The contents of the memory 512, or any portion thereof, may be stored to and retrieved from the storage device 528 as needed. The I/O device interface 522 provides an interface to any of various other I/O devices or devices of other types, such as printers or fax machines. The network interface 524 provides one or more communication paths from the computing device 500 to other digital devices and computer systems.

Although the computing device 500 shown in FIG. 5 illustrates a particular bus structure providing a direct communication path among the processors 506, the memory 512, the bus interface 508, the display system 504, and the I/O bus interface unit 514, in alternative embodiments the computing device 500 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 514 and the I/O bus 508 are shown as single respective units, the computing device 500, may include multiple I/O bus interface units 514 and/or multiple I/O buses 516. While multiple I/O interface units are shown, which separate the I/O bus 516 from various communication paths running to the various I/O devices, in other embodiments, some or all of the I/O devices are connected directly to one or more system I/O buses.

In various embodiments, the computing device 500 is a multi-user mainframe computer system, a single-user system, or a server computer or similar device that has little or no direct user interface, but receives requests from other computer systems (clients). In other embodiments, the computing device 500 may be implemented as a desktop computer, portable computer, laptop or notebook computer, tablet computer, pocket computer, telephone, smart phone, or any other suitable type of electronic device.

In an embodiment, the memory 512 may include a random-access semiconductor memory, storage device, or storage medium (either volatile or non-volatile) for storing or encoding data and programs. In another embodiment, the memory 512 represents the entire virtual memory of the computing device 500, and may also include the virtual memory of other computer systems coupled to the computing device 500 or connected via a network 530. The memory 512 may be a single monolithic entity, but in other embodiments the memory 512 may include a hierarchy of caches and other memory devices. For example, memory may exist in multiple levels of caches, and these caches may be further divided by function, so that one cache holds instructions while another holds non-instruction data, which is used by the processor. Memory 512 may be further distributed and associated with different CPUs or sets of CPUs, as is known in any various so-called non-uniform memory access (NUMA) computer architectures.

The memory 512 may store all or a portion of the software (or firmware) components and data shown in FIG. 1-3. For example, the memory 512 may include an image processing system 512A, electronic map data 512B, and mapping system 512C. The image processing system 512A and mapping system 512C may include computer code executable by the processor 506 to implement or otherwise execute the operations for detecting and visualizing areas or objects of interest on an electronic map based on video playback watch patterns, as described herein. These programs and data structures are illustrated in FIG. 1-3 as being included within the memory 512 in the computing device 500;

however, in other embodiments, some or all of them may be on different computer systems and may be accessed remotely, e.g., via a network 530. The computing device 500 may use virtual addressing mechanisms that allow the programs of the computing device 500 to behave as if they only have access to a large, single storage entity instead of access to multiple, smaller storage entities. Thus, while the components and data shown in FIG. 1-3 are illustrated as being included within the memory 512, these components and data are not necessarily all completely contained in the same storage device at the same time. Although the components and data shown in FIG. 1-3 are illustrated as being separate entities, in other embodiments some of them, portions of some of them, or all of them may be packaged together.

In an embodiment, the components and data shown in FIG. 1-3 may include instructions or statements that execute on the processor 506 or instructions or statements that are interpreted by instructions or statements that execute the processor 506 to carry out the functions as further described below. In another embodiment, the components shown in FIG. 1-3 may be implemented in hardware via semiconductor devices, chips, logical gates, circuits, circuit cards, and/or other physical hardware devices in lieu of, or in addition to, a processor-based system. In an embodiment, the components shown in FIG. 1-3 may include data in addition to instructions or statements.

FIG. 5 is intended to depict representative components of the computing device 500. Individual components, however, may have greater complexity than represented in FIG. 5. In FIG. 5, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 5 may be implemented, in various embodiments, in a number of different ways, including using various computer applications, routines, components, programs, objects, modules, data structures etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    receiving video data of objects in a geographic area, the video data comprising:
        location data indicating a location of the geographic area, wherein the location data includes GPS coordinates that are associated with the location of the geographic area; and
    focus data indicating areas of the video data focused on while viewing the video data;
    identifying, using at least the focus data, a first object focused on while viewing the video data, wherein identifying the first object focused on comprises:
        extracting, using the focus data, an image of an area focused on while viewing the video data; and
        identifying the first object in the image of the area focused on, wherein identifying the first object in the image comprises:
            training an image classification algorithm using a set of images of objects; and
            executing the trained image classification algorithm using the image of the area focused on to identify the first object;
    extracting an image of the first object from the video data;
    determining, using the image and the location data, a second object corresponding to the first object on a visual data map of the geographic area; and
    rendering an indicator of the first object at the second object in the visual data map.

2. The method of claim 1, wherein the focus data is generated by an eye tracking system while viewing the video data.

3. The method of claim 1, wherein the visual data map is at least one of a three dimensional map of the geographic area and a rendering of a street level view of the geographic area.

4. The method of claim 1, wherein the video data includes data of at least two videos and the method further comprise generating, using the second object and the location data, a database of focused on objects.

5. The method of claim 4, further comprising:
    receiving an identifier of a focused on object stored in the database; and
    rendering, in response to receiving the identifier, indicators on the focused on object in the visual data map.

6. The method of claim 5, wherein the indicators indicate a number of times objects in the video data corresponding to the second focused on object were focused on while viewing the video data.

7. The method of claim 4, wherein the focus data indicates areas of the at least two videos a user focused on while viewing the at least two videos, and the rendering further comprises:
    identifying, in the database, a set of object focused on by the user; and
    rendering indicators on the set of objects in the visual data map.

8. The method of claim 4, wherein the focus data indicates areas of the at least two videos at least two users focused on while viewing the at least two videos, and the rendering further comprises:
    identifying, in the database, a set of object focused on by a subset of the at least two users; and
    rendering indicators on the set of objects in the visual data map.

9. The method of claim 8, wherein the subset of at least two users is a majority of the at least two users.

10. A system to identify and visualize areas of interest on an electronic map based on video playback watch patterns, the system configured to:
    receive video data of objects in a geographic area, the video data comprising:
        location data indicating a location of the geographic area, wherein the location data includes GPS coordinates that are associated with the location of the geographic area; and
    focus data indicating areas of the video data focused on while viewing the video data;
    identify, using at least the focus data, a first object focused on while viewing the video data;
    extract an image of the first object from the video data;
    determine, using the image and the location data, a second object corresponding to the first object on a visual data map of the geographic area, wherein the visual data map corresponds to the location data received from the video data of the objects in the geographic area; and render an indicator of the first object at the second object in the visual data map.

11. The system of claim 10, wherein the system if further configured to identify the first object focused on by executing a set of operations to:
    extract, using the focus data, an image of an area focused on while viewing the video data; and
    identify the first object in the image of the area focused on.

12. The system of claim 11, wherein the system is further configured to identify the first object in the image by executing a set of operations to:
    train an image classification algorithm using a set of images of objects; and
    execute the trained image classification algorithm using the image of the area on to identify the first object.

13. The system of claim 10, wherein the focus data is generated by an eye tracking system while viewing the video data.

14. The system of claim 10, wherein the visual data map is at least one of a three dimensional map of the geographic area and a rendering of a street level view of the geographic area.

15. A computer program product for identifying and visualizing areas of interest on an electronic map based on video playback watch patterns, the computer program product including a computer readable storage medium having program instructions embodied therewith, wherein the computer readable storage medium is not a transitory signal per se, the program instructions executable by a processing circuit to cause the processing circuit to perform a method comprising:
    receiving video data of objects in a geographic area, the video data comprising:
        location data indicating a location of the geographic area, wherein the location data includes GPS coordinates that are associated with the location of the geographic area; and
        focus data indicating areas of the video data focused on while viewing the video data;
    identifying, using at least the focus data, a first object focused on while viewing the video data;
    extracting an image of the first object from the video data;
    determining, using the image and the location data, a second object corresponding to the first object on a visual data map of the geographic area, wherein the visual data map corresponds to the location data received from the video data of the objects in the geographic area; and
    rendering an indicator of the first object at the second object in the visual data map.

16. The computer program product of claim 15, wherein identifying the first object focused on comprises:
    extracting, using the focus data, an image of an area focused on while viewing the video data; and
    identifying the first object in the image of the area focused on.

17. The computer program product of claim 16, wherein identifying the first object in the image comprises:
    training an image classification algorithm using a set of images of objects; and
    executing the trained image classification algorithm using the image of the area on to identify the first object.

18. The computer program product of claim 15, wherein the focus data is generated by an eye tracking system while viewing the video data.

19. The method of claim 1, wherein the indicator of the first object at the second object in the visual data map comprises an advertisement.

20. The method of claim 1, wherein the GPS coordinates that are associated with the location of the geographic area are generated by a camera that captured the video data.

* * * * *